United States Patent [19]

Reynolds et al.

[11] Patent Number: 4,747,917

[45] Date of Patent: May 31, 1988

[54] SCALE-FREE PROCESS FOR PURIFYING CONCENTRATED ALKALI METAL HALIDE BRINES CONTAINING SULFATE IONS AS AN IMPURITY

[75] Inventors: Don E. Reynolds, Mt. Verd; Paul W. Breaux, deceased, late of Cleveland, Tenn., by Vashti C. Breaux, executor; Emily J. Reed, Englewood, all of Tenn.

[73] Assignee: Olin Corporation, Cheshire, Conn.

[21] Appl. No.: 20,612

[22] Filed: Mar. 2, 1987

[51] Int. Cl.$^4$ ................................................. C25B 1/14
[52] U.S. Cl. ...................... 204/98; 204/128; 23/303; 23/301; 203/7; 423/555; 423/499; 423/641
[58] Field of Search .................. 204/98, 128; 423/555, 423/166, 499, 183, 641; 23/303, 301; 203/7

[56] References Cited

U.S. PATENT DOCUMENTS 3,201,333 3/1962 Sakowski ............................ 204/128
3,970,528 7/1976 Zirngiebl et al. ...................... 204/98

FOREIGN PATENT DOCUMENTS 2127438 3/1980 Fed. Rep. of Germany .

OTHER PUBLICATIONS

M. Z. Rogozovskaya, N. K. Luk'yanova, and T. I. Kononahuk, Khim. Prom., 1977, No. 10, 770–772.
M. Z. Rogozovskaya, N. K. Luk'yanova, and T. I. Kononahuk, Khim. Prom., 1978, No. 5, 362–365.
M. Z. Rogozoskaya, T. I. Kononahuk, and N. K. Luk-'yanova, Zurnal Prikladnoi Khimii, vol. 52, No. 3, 601–605, 1979.
M. Z. Rogozovskaya and V. V. Eschenko, Zhurnal Prikladnoi Khimii, vol. 54, No. 6, pp. 1231–1234, Jun. 1981.
M. Z. Rogozovskaya and T. I. Kononahuk, Zhurnal Prikladnoi Khimii, vol. 54, No. 8, 1708–1711, Aug. 1981.

Primary Examiner—John F. Niebling
Assistant Examiner—Kathryn Rubino
Attorney, Agent, or Firm—James B. Haglind

[57] ABSTRACT

A process for reducing sulfate ion concentrations in an alkali metal halide brine to be electrolyzed in an electrolytic cell comprises feeding the alkali metal halide brines to a reaction zone containing a slurry of gypsum crystals having a concentration of at least 5 weight percent of solids to form a brine-containing slurry. An aqueous solution of a brine soluble calcium salt is admixed with the brine-containing slurry in an amount sufficient to reduce the sulfate ion concentration to a desired level. The brine-containing slurry is agitated at a pumping velocity of at least about 1.0 meters per second to release solution supersaturation by gypsum crystal formation. A desulfated alkali metal halide brine having a reduced sulfate ion concentration is passed from the reaction zone to a settling zone, the residence time in the reaction zone being at least 30 minutes, the settling zone residence time based on rise rate to prevent crystal carryover being at least 10 feet per hour, and the desulfated alkali metal halide brine recovered.

14 Claims, 1 Drawing Sheet

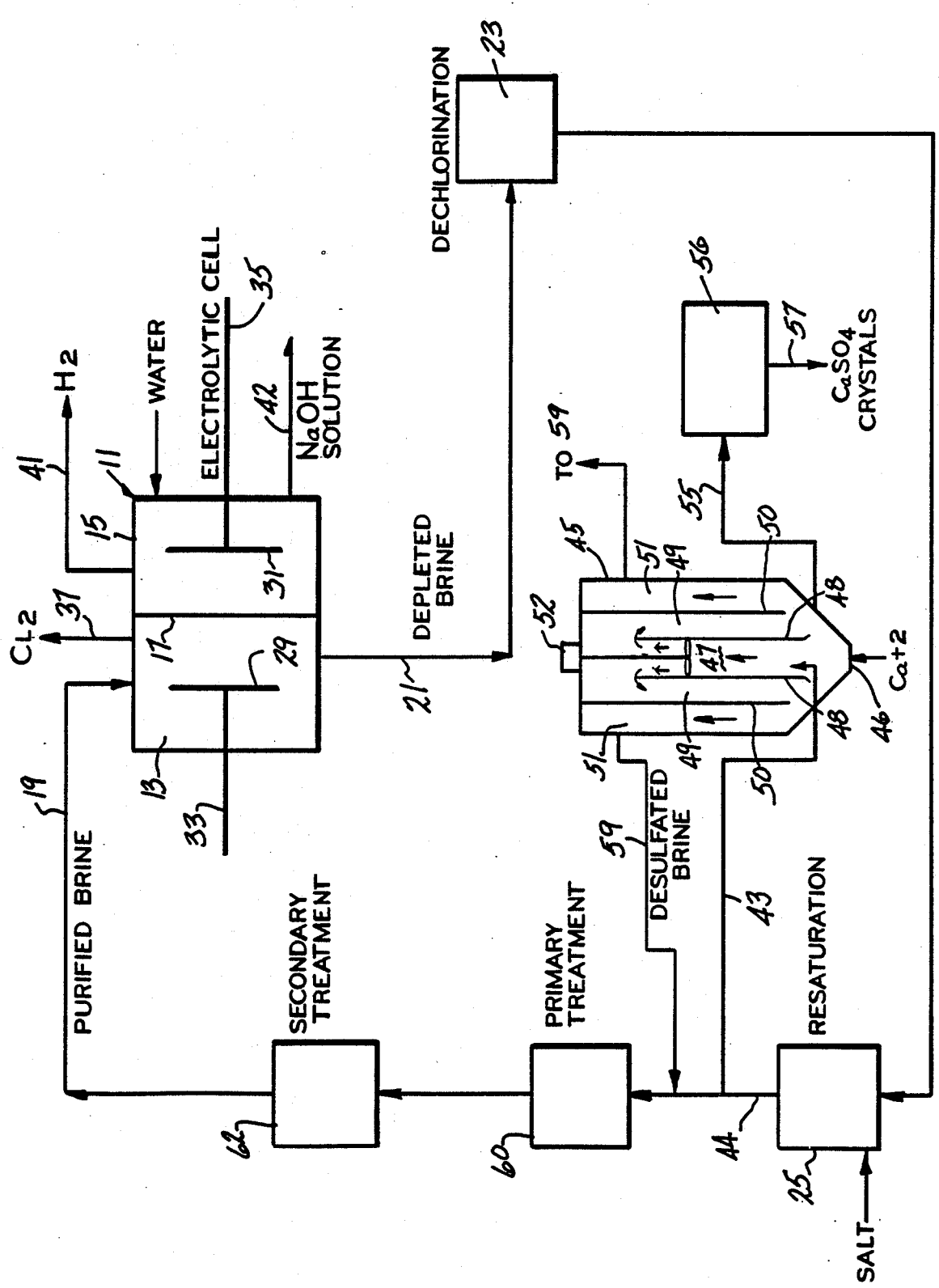

SCALE-FREE PROCESS FOR PURIFYING CONCENTRATED ALKALI METAL HALIDE BRINES CONTAINING SULFATE IONS AS AN IMPURITY

This invention relates to a process for the purification of alkali metal halide brines. More particularly, this invention relates to the treatment of alkali metal halide brines to reduce the sulfate concentration.

Electrolytic cells such as mercury cells or ion exchange membrane cells are used in the commercial production of halogens and alkali metal hydroxides. To each of these types of cells a concentrated solution of an alkali metal halide is continuously fed, a portion of the brine electrolyzed, and a portion of the brine at a reduced alkali metal halide concentration ("spent" or "depleted" brine) is continuously removed from the cell. While the impurities in the brine may vary with the source of the salt or brine, nearly all brines contain an alkali metal sulfate as an impurity. During the electrolysis process and the subsequent treatment of the "spent" brine, the soluble alkali metal sulfate remains dissolved in the brine.

Various methods have been employed to control or reduce the sulfate concentration including the purging of a portion of the brine stream. This approach results in the loss of sodium chloride values, and for many plants may not be possible or ecologically acceptable.

A second method of reducing sulfate concentration in the brine is the formation of Glauber's salt, $Na_2SO_4.10H_2O$. As this method requires heating and cooling cycles, additional expenditures for energy are required.

A further method employs the addition of barium chloride to the sulfate-containing brine to precipitate barium sulfate. This method, however, results in increased chemical costs and undesired restrictions in disposal procedures for the barium sulfate produced.

Another well known method of reducing sulfate ion concentration is to admix the sulfate-containing brine with calcium chloride to convert the sodium sulfate to a calcium sulfate compound such as gypsum.

More recently studies by M. Z. Rogozowskaya et al in a series of articles (Khim. prom. 1978, No. 5, 362–365, Zhur. Prikladnoi Khim. 52, No. 3, 601–605 (1979), 54, No. 6, 1231–34 (1981), and 54, No. 8, 1708–1771, (1981) have been directed towards the formation of gypsum, $CaSO_4.2H_2O$ as a means of reducing sulfate ion concentrations. They describe methods of purification of brine from chlorine production in which gypsum is formed by the reaction of calcium chloride with sulfate ions in the brine in a stirred tank reactor. Concentrated sodium chloride brines (ca 21–26% NaCl) having various concentrations of $Na_2SO_4$ were treated for brief periods of time with stoichiometric amounts of calcium chloride over a temperature range of 10°–60° C. to form gypsum crystals, while reducing the $Na_2SO_4$ concentration. The brine treatment process used gypsum crystals in powder form as seeds in amounts in the range of 0.8 to 3.75 grams per gram of solid phase formed. The brine residence times during crystal formation were about nine minutes. The short residence times employed are, however, not sufficient to reduce supersaturation to the levels required to prevent downstream scaling of pipes and apparatus. Further, the short residence times combined with the small crystal sizes of the gypsum seed crystals results in the production of gypsum crystals which are hard to separate from the treated brine.

The prior art methods, however, do not teach the purification of brine for recycle to an electrolytic cell which avoids extensive scaling of apparatus by calcium sulfate compounds during the sulfate removal step. As a result, these methods may include very frequent descaling treatments which require shutdown of the brine treatment system.

Eliminating, or minimizing, scale formation in an industrial sulfate removal process is of prime importance. Scale can lead to equipment line pluggage and down time. A major cause of scale formation is the inadequate removal of supersaturation produced by the addition of a calcium salt such as calcium chloride. This is directly related to the lack of a sufficient amount of crystals to provide sufficient surface area and nuclei for crystal growth and inefficient suspension of these crystals.

It is an object of the present invention to provide a process for efficiently reducing the sulfate ion concentration of alkali metal halide brines for electrolysis.

Another object of the present invention is to provide a process for reducing the sulfate ion concentration of alkali metal halide brines which allows recycle of the purified brine without substantial scaling by calcium sulfate compounds.

A further object of the present invention is to provide a process for reducing the sulfate ion concentration in alkali metal halide brines which substantially reduces the extent of and frequency of descaling operations required.

An additional object of the present invention is to provide a process for reducing the sulfate ion concentration in alkali metal halide brines which minimizes supersaturation.

These and other objects of the present invention are accomplished in a process for reducing sulfate ion concentrations in an alkali metal halide brine to be electrolyzed in an electrolytic cell which comprises:

(a) feeding the concentrated alkali metal halide brine to a reaction zone containing a slurry of gypsum crystals having a concentration of at least 5 weight percent of solids to form a brine-containing slurry, (b) admixing an aqueous solution of a brine soluble calcium salt with the brine-containing slurry in an amount sufficient to reduce the sulfate ion concentration to a desired level, (c) agitating the brine-containing slurry at a pumping velocity of at least about 1.0 meters per second to release solution supersaturation by gypsum crystallization, (d) passing a desulfated alkali metal halide brine having a reduced sulfate ion concentration from the reaction zone to a settling zone, the residence time in the reaction zone being at least 30 minutes and settling zone residence time based on rise rate to prevent crystal carryover being at least 10 feet per hour, and (e) recovering the desulfated alkali metal halide brine.

The FIGURE is a flow diagram for one embodiment of the process of the present invention.

The present invention will be described in more detail by the discussion of the accompanying FIGURE.

Membrane electrolytic cell 11 is illustrated with two compartments, compartment 13 being the anolyte compartment and compartment 15 being the catholyte compartment. It would be understood that although, as illustrated in the FIGURE, and in the preferred embodiment, the membrane cell is a two compartment cell, a buffer compartment or a plurality of other buffer compartments may be included. Anolyte compartment 13, is separated from catholyte compartment 15 by ionic permselective membrane 17.

An alkali metal halide brine such as sodium chloride brine is fed into anolyte compartment 13 of cell 11 by line 19. The sodium chloride brine feed material entering cell 11 generally has from about 250 to about 320 grams per liter of NaCl.

Cell 11 is further equipped with anode 29 and cathode 31, suitably connected to a source of direct current through lines 33 and 35. Upon passage of a decomposing current through cell 11, chlorine is generated at the anode and removed from the cell in gaseous form through line 37 for subsequent recovery. Hydrogen is generated at the cathode and is removed through line 41. Sodium hydroxide formed at the cathode is removed through line 42 and is substantially sodium chloride free.

Hot depleted sodium chloride brine, having a reduced NaCl content from the purified brine fed to anolyte compartment 13, is removed by anolyte recirculation line 21 and conveyed first to dechlorination vessel 23, and then to resaturation vessel 25 wherein sufficient NaCl is added to reconcentrate the brine to the desired level.

The saturated brine stream, coming from resaturation vessel 25, is split into two portions, one portion being conveyed through line 43 to crystallizer 45. Crystallizer 45 includes upflow reaction zone 47, separated from downflow reaction zones 49 by partitions 48; and overflow settling zones 51 separated from downflow reaction zones 49 by partitions 50. Upflow reaction zone 47 contains agitator 52. A solution of a soluble calcium salt is fed to crystallizer 45 through entry 46. The calcium salt solution mixes with the alkali metal halide brine containing sulfate ions in upflow reaction zone 47 which contains a slurry of gypsum crystals. Treated brine flows from upflow reaction zone 47 to downflow reaction zones 49 and into overflow settling zones 51.

A slurry of gypsum crystals is periodically removed from crystallizer 45 and conveyed through line 55 to separator 56. Gypsum crystals are recovered through line 57.

Desulfated brine from overflow settling zones 51 of crystallizer 45 is conveyed through line 59 to be combined in line 44 with any untreated portion of brine from resaturation vessel 25 prior to the brine being fed to primary and secondary treatment vessels 60 and 62, respectively.

Techniques for the primary and secondary treatment of an alkali metal halide brine are well known in the industry and need not be described in detail. Depleted alkali metal halide brine removed from mercury electrolytic cells is treated in essentially the same manner.

In the novel process of the present invention alkali metal halide brines, such as sodium chloride or potassium bromide, having dissolved alkali metal sulfate concentrations ranging from, for example, about 2 to about 40 grams per liter, are fed to a draft tube crystallizing apparatus. The brines may be treated for sulfate ion reduction, for example, directly after they have been recovered from the electrolytic cell; after the dehalogenation treatment is employed; or preferably, after the brine has been reconcentrated by the addition of alkali metal halide in salt or brine form. The brine stream, or a portion thereof, is preferably continuously fed to the draft tube crystallizer which contains a slurry of gypsum crystals having a concentration of at least 5 percent, preferably at least 15 percent, and more preferably from about 20 to about 30 weight percent of solids. These slurries have a concentration of gypsum crystals as seed of from about 200 to about 4000 grams per gram of gypsum formed by removal of calcium sulfate from the brine. Added to the brine or fed to the draft tube crystallizer is a solution of a calcium salt having a solubility in brine greater than that of gypsum, for example, calcium chloride, calcium oxide or calcium hydroxide, and mixtures thereof. The calcium salt solution is admixed with the brine while maintaining the temperature of the slurry in the range of from about 15° to about 60° C. The formation of gypsum crystals in the crystallizer may be represented by the following equation:

$$Na_2SO_4 + CaCl_2 + 2H_2O \rightarrow CaSO_4 \cdot 2H_2O + 2NaCl \qquad (1)$$

The crystallizing process is carried out while vigorously agitating the slurry at rates which are capable of suspending a high concentration of solid crystals throughout the reaction zone to allow for the release of solution supersaturation by gypsum crystallization. This can result in the formation of additional gypsum crystals and an increase in the size of gypsum crystals in the slurry. Agitation rates employed for suspending the slurry of crystals vary inversely with the size of the reactor. Suitable agitation rates are those, for example, which provide a pumping velocity of from about 0.5 to about 3.0 meters per second. Preferred pumping velocity are those in the range of from about 1 to about 2 meters per second.

During the crystallization of gypsum, the calcium ion concentration present in the slurry is controlled to minimize supersaturation of the purified brine while reducing the sulfate ion concentration to the desired level. Depending on the sulfate ion concentration in the brine, suitable amounts of calcium ion in the desulfated brine include those in the range of from about 0.05 to about 6, preferably from about 0.3 to about 4, and more preferably from about 0.5 to about 2.5 grams per liter. The calcium salt is added as a concentrated solution to prevent undesired dilution of the brine as this results in a higher residual sulfate concentration in the purified brine.

Desulfated brine from the reaction zone, flows into the settling zone of the draft tube crystallizer. The settling zone, essentially free of agitation, permits gypsum crystals remaining in the brine to settle to the bottom of the crystallizer and produces a clear desulfated brine.

Residence times for the brine to be treated in the crystallizer are selected to provide adequate time for crystal growth and crystal separation to assure minimal supersaturation in the purified brine. Suitable residence times include those of from about 30 to about 90 minutes, and preferably from about 60 to about 90 minutes.

The novel process of the present invention produces large crystals of gypsum having an average crystal size in the range of from about 150 to about 250 microns. The gypsum crystals produced are removed continuously or periodically from the draft tube crystallizer and can be readily recovered by known methods of filtration or centrifugation. After separation from the gypsum crystals, the mother liquor, which is desulfated brine, can be combined with desulfated brine from crystallizer 45.

An alkali metal halide brine having a reduced sulfate concentration (desulfated brine) is recovered from the crystallizer. The sulfate ion concentration of the desulfated brine has been reduced from about 5 to about 95, and preferably from about 15 to about 40 percent of the initial sulfate ion concentration of the brine fed to the crystallizer. The solids content of the desulfated brine is less than 0.2 weight percent, preferably less than 0.15 weight percent, and more preferably less than 0.05 weight percent. As supersaturation during the crystallizing process is minimized, the scale formation by calcium sulfate is substantially eliminated in downstream pipes and other apparatus including heat exchangers, which the desulfated brine comes in contact with during the electrolysis process.

As shown on the FIGURE, the desulfated brine can be admixed with any untreated portion of the resaturated brine prior to its treatment at the primary stage. Where desired, the entire brine stream may be fed to the draft tube crystallizer for sulfate removal.

Calcium, magnesium and iron impurities among others are removed or reduced in the primary stage by the addition of an alkali metal carbonate and/or an alkali metal hydroxide to the brine. Secondary brine treatment includes contacting the brine with ion exchange resins to further purify the brine, particularly for use in membrane electrolytic cells.

A further embodiment returns the desulfated brine to the primary treatment stage where, or after which, it is admixed with untreated brine.

In an additional embodiment, the desulfated brine is treated with, for example, an alkali metal carbonate or alkali metal bicarbonate to form calcium carbonate. Following the removal of any excess calcium ion present, the desulfated brine is employed in one of the embodiments discussed above. The calcium carbonate formed may be reacted with hydrochloric acid to produce calcium chloride for use as the calcium salt solution. The calcium carbonate may also be combined with the precipitates recovered in the primary treatment stage which can be reacted with hydrochloric acid or disposed of by well known procedures.

The novel process of the present invention incorporates a reaction zone providing good mixing which is capable of suspending a high concentration of solid crystals while maintaining an adequate reactor residence time to allow for the release of solution supersaturation. This allows new crystal growth to occur primarily on existing crystals and substantially prevents growth on the vessel walls. In addition, this process provides a low velocity settling zone to produce a clear desulfated brine which can be withdrawn while the slurry solids concentration can be varied inside the reaction zone. Control of slurry density permits control of the population balance and allows the production of more uniform crystals. Increasing the slurry density increases the crystal size through a reduction in nucleation and increases crystal retention time in the growing crystal bed. The desulfated brine produced by the process has a low solids carryover. Solids in the brine may become soluble during further processing steps resulting in an undesired increase in sulfate concentration in the brine.

The novel process of the present invention is illustrated by the following EXAMPLE without any intention of being limited thereby.

EXAMPLE

Sodium chloride brine from a mercury cell plant was fed at a rate of 3.5 to 7.0 gallons per minute to the bottom of the reaction zone of a draft tube crystallizer of the type illustrated in the FIGURE. The sodium chloride concentration of the brine during the operation period was in the range of 294 to 308 gpl of NaCl, the sodium sulfate concentration was in the range of 8.3 to 10.1 gpl $Na_2SO_4$, the calcium concentration in the range of 590 to 688 ppm, and the pH at 7.3 to 9.0. The settling zone of the crystallizer contained a slurry of gypsum crystals having a solids content in the range of 14 to 38 percent solids. A calcium chloride solution (30 percent by weight of $CaCl_2$) was fed to the agitation area to react with sulfate ions present to produce additional gypsum crystals.

The crystallizer temperature was maintained at 44°–47° C. The agitator was operated at a speed of 350 rpm to provide pumping rates in the agitation area of 1732 gallons per minute. Sodium chloride brine having reduced sulfate concentrations leave the reaction zone and exit through the overflow zones. The total residence time for brine in the crystallizer was in the range of 30 to 60 minutes. Brine recovered from the crystallizer through the overflow lines contained from about 4.1 to about 7.5 gpl of sulfate and a calcium concentration of 1.46 to 2.90 gpl. The purified brine had a solids content of fine gypsum crystals in the range of 0.08 to 0.38 weight percent. Periodically during the eight days of operation, gypsum crystals were removed from the crystallizer. The level in the overflow zone was lowered and the walls of the crystallizer was inspected. No scale was seen. After shutdown, the crystallizer was drained. No scale was seen inside the reactor.

What is claimed is:

1. Process for reducing sulfate ion concentrations in an alkali metal halide brine to be electrolyzed in an electrolytic cell which comprises:
   (a) feeding the concentrated alkali metal halide brine to a reaction zone containing a slurry of gypsum crystals having a concentration of at least 10 weight percent of solids to form a brine-containing slurry,
   (b) admixing an aqueous solution of a brine soluble calcium salt with the brine-containing slurry in an amount sufficient to reduce the sulfate ion concentration to a desired level,
   (c) agitating the brine-containing slurry at a pumping velocity of at least about 0.5 meters per second to release solution supersaturation by gypsum crystallization,
   (d) passing a desulfated alkali metal halide brine having a reduced sulfate ion concentration from the reaction zone to a settling zone, the residence time in the reaction zone being at least 30 minutes and settling zone residence time based on rise rate to prevent crystal carryover being at least 10 feet per hour, and
   (e) recovering the desulfated alkali metal halide brine.

2. The process of claim 1 in which said alkali metal halide brine is an alkali metal chloride.

3. The process of claim 1 in which the calcium salt solution is selected from aqueous solutions of calcium chloride, calcium oxide, calcium hydroxide and mixtures thereof.

4. The process of claim 1 in which the initial sulfate concentration in the alkali metal halide brine is from about 2 to about 40 grams per liter.

5. The process of claim 1 in which the sulfate ion concentration of the desulfated alkali metal halide brine is in the range of from about 5 to about 95 percent of the initial sulfate ion concentration.

6. The process of claim 2 in which said alkali metal chloride is sodium chloride or potassium chloride.

7. The process of claim 6 in which said calcium salt solution is calcium chloride.

8. The process of claim 7 in which said slurry of gypsum crystals has a concentration of from about 200 to about 4000 grams per gram of gypsum formed by removal of calcium sulfate.

9. The process of claim 8 in which the residence time is from about 30 to about 90 minutes.

10. A process for the purification of an alkali metal chloride brine containing sulfate ion for electrolytic cells which comprises:
   (a) electrolyzing said alkali metal chloride brine containing sulfate ion in an electrolytic cell to produce chlorine and a depleted brine containing dissolved chlorine and sulfate ion,
   (b) removing a portion of said depleted brine from said electrolytic cell,
   (c) removing dissolved chlorine from said depleted brine to produce a depleted brine containing sulfate ion,
   (d) admixing alkali metal chloride with said depleted brine to produce a concentrated brine containing sulfate ion,
   (e) reacting a portion of said concentrated brine containing sulfate ion with calcium chloride in a reaction zone containing at least 5 weight percent of gypsum crystals, to produce additional gypsum crystals,
   (f) agitating said reaction zone at a pumping velocity of at least 0.5 meters per second to release solution supersaturation,
   (g) passing a desulfated concentrated brine to a settling zone, the residence time in the reaction zone being at least 30 minutes and settling zone residence time based on rise rate to prevent crystal carryover being at least 10 feet per hour, and
   (h) removing said desulfated concentrated brine from said settling zone,
   (i) admixing said desulfated concentrated brine with any untreated portion of said concentrated brine containing sulfate ion to form a concentrated brine having a reduced sulfate ion concentration, and
   (j) feeding said concentrated brine having a reduced sulfate ion concentration to said electrolytic cell.

11. The process of claim 10 in which, prior to step i, the desulfated brine is treated in a primary treatment stage.

12. The process of claim 10 in which prior to step i, the desulfated brine is treated with an alkali metal carbonate to form a slurry containing calcium carbonate solids and separating the desulfated brine from the calcium carbonate solids.

13. The process of claim 12 in which said calcium carbonate solids are reacted with hydrochloric acid to produce a solution of calcium chloride.

14. The process of claim 13 in which said solution of calcium chloride is fed to said reaction zone.

* * * * *